United States Patent [19]

Ito

[11] Patent Number: 4,559,277

[45] Date of Patent: Dec. 17, 1985

[54] CERAMIC AND ALUMINUM ALLOY COMPOSITE

[75] Inventor: Masaya Ito, Aichi, Japan

[73] Assignee: NGK Spark Plug Co., Ltd., Aichi, Japan

[21] Appl. No.: 618,692

[22] Filed: Jun. 8, 1984

[30] Foreign Application Priority Data

Jun. 17, 1983 [JP] Japan .................... 58-107648

[51] Int. Cl.⁴ .................. H01P 21/88; H05K 1/05
[52] U.S. Cl. .................... 428/627; 428/630; 428/632; 428/633; 428/689; 428/698; 428/699; 420/528; 75/230; 423/345; 501/96; 423/625
[58] Field of Search .............. 428/627, 630, 632, 633

[56] References Cited

U.S. PATENT DOCUMENTS 3,879,840  4/1975  Ames et al. ................... 29/589

FOREIGN PATENT DOCUMENTS 56-81952  4/1981  Japan .................... 428/627

*Primary Examiner*—Veronica O'Keefe
*Attorney, Agent, or Firm*—Sughrue, Mion, Zinn, Macpeak & Seas

[57] ABSTRACT

A ceramic-aluminum alloy composite in which residual stress between the ceramic and aluminum components is substantially eliminated and strong cohesion is provided between the components of the composite over a wide temperature range. The composite of the invention is an integral combination of a ceramic element, a metallized layer, a cladding layer and an aluminum alloy layer. The metallized layer and the cladding layer are formed in that order on the surface of the ceramic element. The aluminum alloy layer is formed adjacent the cladding layer by pouring and solidification of a molten aluminum alloy. The metallized layer is a thin metal layer formed by any of vapor deposition of a metal, a high-melting metal method, and an activated metal method. The cladding layer is a three-layer laminated structure having top and bottom layers of Cu, Ag or Al and an intermediate layer of a metal dissimilar to the top and bottom layers. The ceramic element is preferably one of $Si_3N_4$, SiC, $Al_2O_3$, $ZiO_2$, mica, LAS and crystalline glass.

6 Claims, 1 Drawing Figure

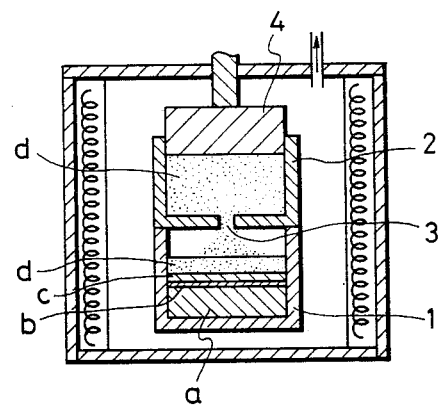

CERAMIC AND ALUMINUM ALLOY COMPOSITE

BACKGROUND OF THE INVENTION

The present invention relates to a ceramic and aluminum alloy composite having an improved bonding strength between the members of the composite.

Aluminum alloys are lightweight, strong, easily machinable and have excellent electrical and heat conducting properties. Because of these advantages, aluminum alloys are extensively used in low-temperature applications. However, their service at high temperatures is limited, largely due to their poor heat resistance and heat insulating ability.

Ceramics on the other hand have excellent heat resisting and insulating properties. Numerous attempts have been made to eliminate the defects of aluminum alloys by combining them with ceramics into ceramic-aluminum alloy composites. However, none of the methods that have been proposed to date for bonding ceramics to aluminum alloys achieve completely satisfactory results. The most favorable approaches are the techniques of shrink fitting and casting, but even these provide only composites of low thermal reliability due not only to the inherent thermal expansion coefficient mismatch between aluminum and ceramics but also to aluminum failure. Aluminum has a thermal expansion coefficient of $24 \times 10^{-6}/°C$. at temperatures between room temperature and 500° C., whereas $Si_3N_4$ and $ZrO_2$, which are two typical ceramics, have respective thermal expansion coefficients of $2 \times 10^{-6}/°C$. and $10 \times 10^{-6}/°C$. in the same temperature range. Because of this thermal expansion coefficient mismatch, a ceramic cannot be directly bonded to aluminum without producing a residual stress that often leads to cracking of the ceramic.

SUMMARY OF THE INVENTION

The primary object of the present invention is to provide a ceramic and aluminum alloy composite having none of these defects of the conventional composites.

According to the present invention, a thin metallized layer is first formed on the ceramic surface by vapor deposition, by a high-melting method, or by an activated metal method. Then, a cladding layer is formed on the metallized layer. Next, an aluminum alloy layer is formed by pouring and solidifying a molten aluminum alloy in contact with the cladding layer. This method provides strong cohesion between the layers of the integral ceramic-aluminum alloy composite.

According to the present invention, the ceramic is selected from among the materials that are not affected by the heat of the molten aluminum alloy, such as $Si_3N_4$, SiC, $Al_2O_3$, $ZrO_2$, mica, LAS and crystalline glass. The thin metallized layer may be formed of any material by any method. Typical methods of forming the thin metallized layer are described below.

BRIEF DESCRIPTION OF THE DRAWING

The single drawing FIGURE is a side elevational section of a vacuum chamber that can be used to cast an aluminum alloy onto a ceramic substrate.

DESCRIPTION OF THE PREFERRED EMBODIMENTS

The formation of preferred embodiments of a ceramic-aluminum composite of the invention will now be discussed. First, techniques for forming the thin metallized layer which joins the ceramic and aluminum members will be discussed in detail.

Vapor Deposition Techniques (1) The surface of a shaped ceramic article is provided with a coat of a metal of the group IV A of the periodic table (Ti, Zr or Hf) by physical vapor deposition. A coat of a metal of the group VI A (Cr, Mo or W) is then formed on the coat of group IV A metal by physical vapor deposition. This coat of group VI A metal is chemically plated with a coat of a metal of the group I B (Cu, Ag or Au), thereby forming a thin metallized layer.

(2) The surface of shaped ceramic article is provided with a coat of a metal of the group IV A (Ti, Zr or Hf) by physical vapor deposition. The resulting coat is then provided with a coat of a metal of the group I B (Cu, Ag or Au) by physical vapor deposition or chemical plating so as to form a thin metallized layer.

(3) The surface of a shaped ceramic article is provided with a coat of a metal of the group IV A (Ti, Zr or Hf) or group VI A (Cr, Mo or W) by physical vapor deposition. The resulting coat is then provided with a coat of a metal of the group I B (Cu, Ag, or Au) by physical vapor deposition or chemical plating, thereby forming a thin metallized layer.

High-Melting Metal Method

A mixture of Mo or W or both and at least one of $TiH_2$, Mn and $SiO_2$ is ground into particles, which are intimately blended to form a metallizing paste. The major component of this paste is Mo or W or both. The paste is applied onto the ceramic surface by an automatic printing machine or any other suitable device. The ceramic with the coat of metallized paste is fired in a hydrogen furnace at between 1,400° and 1,600° C. After forming a Ni plating (a few microns thick) to provide an improved wettability with a brazing filler, the ceramic is heated in a hydrogen furnace at between 800° and 1,000° C. to thereby provide a thin metallized layer.

Activated Metal Techniques (1) A titanium (Ti) or zirconium (Zr) foil and a Ag-Cu alloy foil are placed on the surface of a shaped ceramic article, and the assembly is heated at between 800° and 1,200° C. in an nonoxidizing atmosphere to thereby form a thin metallized layer of Ti (or Zr)-Ag-Cu eutectic.

(2) A Ti or Zr foil and a Ag-Cu eutectic brazing foil are placed on the surface of a shaped ceramic article, and the assembly is heated at between 800° and 1,200° C. in a nonoxidizing atmosphere until a thin metallized layer of a Ti (or Zr)-Ag-Cu eutectic forms.

According to the present invention, a cladding of the metals specified below is formed on the thin metallized layer, and thereafter an aluminum alloy layer is bonded to that cladding using a casting technique so as to produce a ceramic and aluminum alloy composite. It is believed that the desired ceramic and aluminum alloy composite can also be obtained by overlying the metallized layer with an ordinary metal coat rather than the cladding of metals. Illustrative materials that can be used for this purpose are ones which dissolve in the aluminum matrix such as copper (Cu), magnesium (Mg)

and silicon (Si), as well as aluminum per se because these metals ensure easy bonding to an aluminum alloy.

From a viewpoint of solid solubility characteristics, copper and aluminum achieve the best results. However, the reactivity of copper with molten aluminum alloy is so high that if a copper plate is used as a metal member to be formed on the metallized layer, it will be corroded during the casting of an aluminum alloy. It is very difficult to minimize this corrosion problem by controlling the temperature conditions used in the casting of the aluminum alloy, and the resulting ceramic and aluminum alloy composite is far from being satisfactory.

A metal of low thermal expansion coefficient such as Kovar and molybdenum could also be deposited on the metallized layer. However, the thermal expansion coefficients of Kovar and molybdenum differ so greatly from that of typical ceramics that the residual stress in the ceramic cannot be sufficiently absorbed. The reactivity of molybdenum with molten aluminum alloy is not so good. As a result, cracks and other defects occur in the ceramic layer, and this leads to the production of a ceramic and aluminum alloy composite of low reliability.

As a consequence of various studies made to form a ceramic and aluminum alloy composite which does not suffer from the disadvantages described above, the present inventors have found that the stated object can be achieved by interposing between the metallized layer on the ceramic surface and an aluminum alloy layer a cladding consisting of a top layer made of Cu, Ag or Al, an intermediate metallic layer, and a bottom layer made of Cu, Ag or Al.

The top and bottom layers may be made of the same metal, such as copper, and in this case, the cladding layer consists of Cu, metal and Cu. Alternatively, the top and bottom layers may be made of two different metals such as Ag and Cu, whereby the cladding consists of Ag, metal and Cu. In any case, the metal that forms the intermediate layer should be dissimilar from the metals used in the top and bottom layers. Most metals have thermal expansion coefficients between those of typical aluminum alloys and ceramics. If $Si_3H_4$ is used as the ceramic, the metal used in the intermediate layer of the cladding is selected from among molybdenum, Invar and Kovar, all of which have relatively low thermal expansion coefficients. If the top or bottom layer or both layers is made of copper, its thickness may be reduced and nickel or iron may be used as the material for the intermediate layer. This arrangement is also effective in providing highly reliable ceramic and aluminum alloy composites without causing cracks in the ceramic member. The top layer of the cladding that is to be contacted by a molten aluminum alloy may be made of metals other than Ag, Cu and Al, such as Ni, Fe, Si and Kovar, which easily react with the molten aluminum alloy. These metals also ensure strong bonding with the aluminum alloy.

Examples of ceramic and aluminum alloy composites according to the present invention, as well as comparative examples, were prepared and checked for their shear strength. The respective examples were prepared by the following procedures:

EXAMPLES OF THE PRESENT INVENTION

1. Using a metallized layer formed by the high-melting metal method:
   (1-1) To an alumina green sheet (90% $Al_2O_3$), a paste composed of 3% ethyl cellulose and a 9:1:1 mixture of W, $TiH_2$ and $SiO_2$ was applied. The alumina sheet was fired in a hydrogen furnace at 1,500° C. for 1 hr. A metallized layer was formed on the fired sheet by plating a Ni coat to a thickness of 2 microns. One of the metal claddings shown in the Table below was bonded to the metallized layer with a Ag-Cu eutectic brazing filler in a hydrogen furnace held at 850° C. The assembly was placed in a chamber of the type shown in the accompanying drawing, which was evacuated to $10^{-4}$ Torr or pressurized from the top with argon (Ar) or nitrogen ($N_2$) gas. While the chamber was heated to about 750° C., a melt of an aluminum alloy (AC4A) was poured over the cladding layer on the metallized layer, thereby forming a ceramic and AC4A composite.
   (1-2) Ceramic and aluminum alloy composites were prepared by repeating the procedure of (1-1) except that one of the metal claddings shown in the Table given below was formed on a Ni metallized layer formed on a yttria-zirconia green sheet (90% $ZrO_2$).

2. Using a metallized layer formed by vapor deposition:
   (2-1) Sintered alumina (porosity: 3%, $Al_2O_3$ content: 90%, density: 3.60 g/cm$^3$) was polished to provide a smooth surface and cleaned with acetone. The cleaned ceramic sheet was placed in a bell jar, which was evacuated to $10^{-6}$ Torr and heated at 200° C. A pool of aluminum was melted under irradiation with electron beams and vapor-deposited on the ceramic substrate to form an Al metallized coat of a thickness of about 5 microns. An Al-Ni-Cu cladding having the composition shown in the Table below was formed on the Al metallized layer in such a manner that the aluminum layer of the cladding was in contact with the metallized layer. An aluminum alloy was then bonded to the cladding by the same procedure as used in (1-1).
   (2-2) Sintered silicon nitride (porosity: 1%, $Si_3N_4$ content: 90%, density: 3.25 g/cm$^3$) was polished to give a smooth surface and cleaned with acetone. The cleaned ceramic substrate was provided with an aluminum metallized layer as in (2-1). Subsequently, an aluminum alloy was bonded to the ceramic substrate through an Al-Ni-Cu cladding (composition shown in the Table) as in (2-1).
   (2-3) Sintered alumina (porosity: 3%, $Al_2O_3$ content: 90%, density: 3.60 g/cm$^3$) was polished to give a smooth surface and cleaned with acetone. The cleaned ceramic substrate was placed in a bell jar, which was evacuated to $10^{-6}$ Torr and heated at 200° C. Layers of Zr, Cr and Cu were vapor-deposited on the substrate in respective thicknesses of 0.2 microns, 0.2 microns and 5 microns. Thereafter, a cladding having the composition shown in the Table was bonded to the metallized layer in a hydrogen furnace (850° C.) with the aid of a Ag-Cu eutectic brazing filler. Subsequently, an aluminum alloy (AC4A) was cast in air under pressure onto the cladding so as to form a ceramic and aluminum alloy composite.
   (2-4) Sintered silicon nitride (porosity: 1%, $Si_3N_4$ content: 90%, density: 3.25 g/cm$^3$) was polished to give a smooth surface and cleaned with acetone. The cleaned ceramic substrate was placed in a bell jar which was evacuated to $10^{-6}$ Torr and heated at 200° C. Vapor sources (Zr, Cr and Cu) were melted under irradiation with electron beams and deposited on the ceramic substrate to form metallized Zr, Cr and Cu layers in respective thicknesses of 0.2 microns, 0.2 microns and 5 microns. Thereafter, one of the claddings of the compositions shown in the Table was bonded to the metallized coating in a hydrogen furnace (850° C.) with the aid of a Ag-Cu eutectic brazing filler. Subsequently, an aluminum alloy (AC4A) was cast in air under pressure onto the cladding so as to form a ceramic and aluminum alloy composite.

COMPARATIVE EXAMPLES

1. A ceramic to aluminum composite example was prepared as in (1-1) except that the metallized layer was coated with a Cu coat rather than the claddings.

2. A ceramic to aluminum composite example was prepared as in (1-2) except that the metallized layer was coated with a Cu coat rather than the claddings.

In preparing the examples of the present invention and the comparative examples, the aluminum alloy (AC4A) was cast in a vacuum chamber of the type shown in the accompanying drawing. This chamber contained a U-shaped lower alumina mold 1 in which was placed a shaped ceramic article a having formed thereon, in sequence, a metallized layer b and a cladding or Cu coat c. An upper mold 2 with a center hole 3 (about 1 mmφ) provided in the bottom for introducing molten aluminum alloy was stacked on the lower mold 1. An aluminum alloy melt d in the upper mold 2 was forced down by a pusher device 4 through the hole 3 so as to bond the cladding or Cu coat c with the aluminum alloy, thereby providing a ceramic and aluminum alloy composite. The vacuum chamber was evacuated to about $10^{-4}$ Torr and heated by a coil 5.

The examples of the present invention and the comparative examples were subjected to a shearing test, the results of which are shown in the following Table. The ceramic substrate for each test example measure 10 mm×10 mm×5 mm. The shear strength was measured with a Shimadzu Autograph (product of Shimadzu Seisakusho, Ltd. of Japan) at a load rate of 0.5 mm/min.

It can be seen from the Table that the ceramic to aluminum alloy composite examples of the present invention had satisfactory shear strength values whereas the comparative examples had low shear values and were not useful in practical applications.

TABLE

| Example No. | Ceramic | Metallization method | Cladding (thickness in mm) | Al alloy | Heating atmosphere | Shear strength (kg/cm$^2$) |
| --- | --- | --- | --- | --- | --- | --- |
| 1-1 | $Al_2O_3$ | high-melting metal method | Cu/Ni/Cu (0.4/0.3/0.4) | AC4A | vacuum | 280 |
| 1-1 | " | high-melting metal method | Cu/Ni/Cu (0.8/0.2/0.8) | " | " | 338 |
| 1-1 | " | high-melting metal method | Cu/Mo/Cu (1.0/0.3/1.0) | " | " | 335 |
| 1-1 | " | high-melting metal method | Cu/Mo/Cu (1.0/0.3/1.0) | " | Ar | 331 |
| 1-1 | " | high-melting metal method | Cu/Mo/Cu (1.0/0.3/1.0) | " | Ar | 318 |
| Comp. Example 1 | " | high-melting metal method | Cu (0.3) | " | vacuum | 58 |
| 1-2 | $ZrO_2$—$Y_2O_3$ | high-melting metal method | Cu/Ni/Cu (0.4/0.3/0.4) | " | " | 220 |
| 1-2 | $ZrO_2$—$Y_2O_3$ | high-melting metal method | Cu/Mo/Cu (1.0/0.3/1.0) | " | " | 228 |
| Comp. Example 2 | $ZrO_2$—$Y_2O_3$ | high-melting metal method | Cu (0.3) | " | " | 15 |
| 2-1 | $Al_2O_3$ | vapor deposition | Al/Ni/Cu (1.0/0.2/2.0) | " | " | 348 |
| 2-2 | $Si_3N_4$ | vapor deposition | Al/Ni/Cu (1.0/0.2/2.0) | " | " | 510 |
| 2-3 | $Al_2O_3$ | vapor deposition | Cu/Ni/Cu (0.8/0.2/0.4) | " | " | 225 |
| 2-3 | " | vapor deposition | Cu/Ni/Cu (0.8./0.2/0.8) | " | " | 200 |
| 2-4 | $Si_3N_4$ | vapor deposition | Cu/Mo/Cu (1.0/0.3/1.0) | " | " | 250 |
| 2-4 | " | vapor deposition | Cu/Invar/Cu (0.5/0.5/0.5) | " | " | 200 |
| 2-4 | " | vapor deposition | Cu/W/Cu (0.5/0.2/0.5) | " | " | 185 |

I claim:

1. A ceramic-aluminum alloy composite comprising an integral combination of a ceramic element, a metallized layer, a cladding layer and an aluminum alloy layer, said metallized layer and said cladding layer being sequentially formed on a surface of said ceramic element, said aluminum alloy layer being formed adjacent said cladding layer by pouring and solidification of a molten aluminum alloy, wherein said cladding layer comprises a three-layer laminated structure having top and bottom layers each of a material selected from the group consisting of Cu, Ag and Al and an intermediate layer of a metal dissimilar from the metal of said top and bottom layers.

2. The ceramic-aluminum alloy composite according to claim 1, wherein said metallized layer comprises a thin metal layer formed by vapor deposition of a metal.

3. The ceramic-aluminum alloy composite according to claim 1, wherein said metallized layer comprises a thin metal layer formed by a high-melting metal method.

4. The ceramic-aluminum alloy composite according to claim 1, wherein said metallized layer comprises a thin metal layer formed by an activated metal method.

5. The ceramic-aluminum alloy composite according to claim 1, wherein said ceramic element is made of a material selected from the group consisting of $Si_3N_4$, SiC, $Al_2O_3$, $ZrO_2$, mica, LAS and crystalline glass.

6. The ceramic-aluminum alloy composite according to claim 1, wherein said ceramic element is made of $ZrO_2$-$Y_2O_3$.

* * * * *